(12) United States Patent
Mori

(10) Patent No.: US 8,268,020 B2
(45) Date of Patent: Sep. 18, 2012

(54) METHOD FOR MANUFACTURING BATTERY CASE AND METHOD FOR MANUFACTURING HERMETIC BATTERY

(75) Inventor: Katsuhiko Mori, Osaka (JP)

(73) Assignee: Panasonic Corporation, Osaka (JP)

(*) Notice: Subject to any disclaimer, the term of this patent is extended or adjusted under 35 U.S.C. 154(b) by 1077 days.

(21) Appl. No.: 12/095,077

(22) PCT Filed: Nov. 26, 2007

(86) PCT No.: PCT/JP2007/073264
§ 371 (c)(1),
(2), (4) Date: May 27, 2008

(87) PCT Pub. No.: WO2008/081671
PCT Pub. Date: Jul. 10, 2008

(65) Prior Publication Data
US 2010/0167119 A1    Jul. 1, 2010

(30) Foreign Application Priority Data
Dec. 28, 2006 (JP) ................... 2006-356296

(51) Int. Cl.
*H01M 4/82* (2006.01)
(52) U.S. Cl. ............ 29/623.1; 429/164
(58) Field of Classification Search .......... 29/623.1; 429/164
See application file for complete search history.

(56) References Cited

U.S. PATENT DOCUMENTS

| | | | |
|---|---|---|---|
| 3,802,363 A * | 4/1974 | Langewis | 72/466.7 |
| 3,864,995 A * | 2/1975 | Langewis | 82/54 |
| 4,030,432 A | 6/1977 | Miller et al. | 413/69 |
| 4,557,167 A * | 12/1985 | Cvacho | 82/47 |

FOREIGN PATENT DOCUMENTS

| | | |
|---|---|---|
| GB | 1555114 | * 11/1979 |
| JP | 59-173945 | * 10/1984 |
| JP | 61-027058 | 2/1986 |
| JP | 8-321286 | 12/1996 |
| JP | 9-161736 | 6/1997 |
| JP | 9-312150 | 12/1997 |
| JP | 10-321198 | 12/1998 |
| JP | 2001-52656 | 2/2001 |
| JP | 2004-241186 | 8/2004 |
| JP | 2005-71710 | 3/2005 |
| JP | 2005-288631 | * 10/2005 |

OTHER PUBLICATIONS

European Search Report issued in European Patent Application No. EP 07849969.5 dated Jan. 19, 2011.

* cited by examiner

*Primary Examiner* — Ula C. Ruddock
*Assistant Examiner* — Thomas H. Parsons
(74) *Attorney, Agent, or Firm* — McDermott Will & Emery LLP

(57) ABSTRACT

A battery case is formed by drawing a metallic plate thin to form a cylindrical body 10 having a closed end and cutting away part of the cylindrical body 10 at an opening 11 thereof in the direction perpendicular to an axis of the cylindrical body 10. The cutting of the cylindrical body 10 is carried out by moving a second blade 30 arranged outside the cylindrical body 10 relatively toward the axis of the cylindrical body with a first blade kept abutting the inner circumference of the cylindrical body 10. As a result, an inward burr 13 extending in the direction perpendicular to the side face of the cylindrical body 10 is formed on a cut surface 12 of the cylindrical body 10, but the burr 13 is prevented from entering the battery case.

14 Claims, 10 Drawing Sheets

FIG. 6
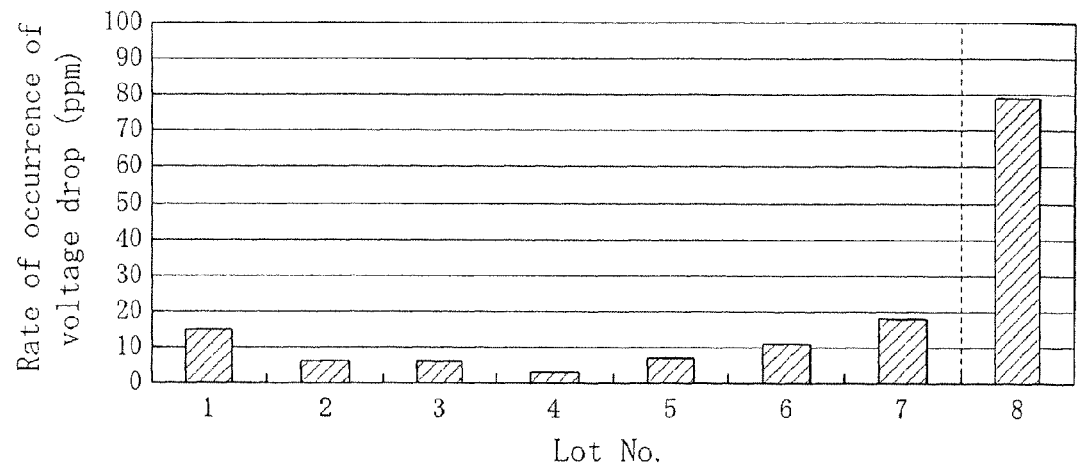
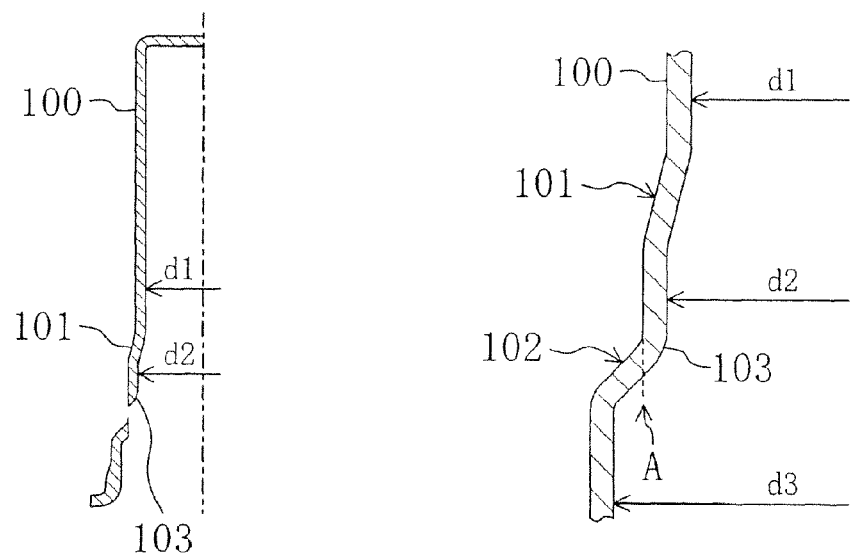
FIG. 7A
(Prior Art)
FIG. 7B
(Prior Art)

METHOD FOR MANUFACTURING BATTERY CASE AND METHOD FOR MANUFACTURING HERMETIC BATTERY

RELATED APPLICATIONS

This application is the U.S. National Phase under 35 U.S.C. §371 of International Application No. PCT/JP2007/073264, filed on Nov. 26, 2007, which in turn claims the benefit of Japanese Patent Application No. JP 2006-356296, filed on Dec. 28, 2006, the disclosures of which Applications are incorporated by reference herein.

TECHNICAL FIELD

The present invention relates to a method for manufacturing battery cases for hermetic batteries such as primary and secondary batteries and a method for manufacturing hermetic batteries using the battery cases obtained by the former method.

BACKGROUND ART

Hermetic batteries such as primary and secondary batteries are assembled by arranging battery elements such as a positive electrode, a negative electrode and an electrolyte in a cylindrical battery case having a closed end and sealing an opening of the battery case with a lid and a gasket.

If foreign matter such as a piece of metal comes into the battery case in the assembly process and internal short circuit occurs, output voltage of the battery may be decreased or unfavorable gas may be generated. Therefore, the entry of the foreign matter in the assembly process should be prevented for improved battery reliability.

The battery case is formed by drawing a metallic plate thin to form a cylindrical body having a closed end and cutting part of the cylindrical body at an opening thereof along its circumference. In general, the cutting is carried out by pressing using a punch and a die. However, the pressing inevitably leaves burrs on the cut surface of the cylindrical body because a certain clearance lies between the punch and the die. The occurrence of the burrs may be reduced by optimizing the clearance, but the burrs cannot be completely eliminated.

If there are burrs on the cut surface of the cylindrical body or an end face of the battery case, problems may arise when the battery elements are placed in the battery case. More specifically, an active material mixture layer on the surface of a wound positive or negative electrode may partially be peeled off when it comes into contact with the burrs. If a peeled piece of the layer enters the battery case, it may cause internal short circuit. The burrs generated on the end face of the battery case may also come off to cause external short circuit between the battery case and the lid (sealing plate), thereby causing voltage drop. Further, if the gasket comes into contact with the burrs when it is fitted in the opening of the battery case, the gasket may partially be scratched, which may possibly decrease the hermeticity of the battery.

In order to solve these problems, it is necessary to prevent the generation of the burrs as much as possible in the step of cutting the closed-end cylindrical body. However, since the burrs are inevitably generated, it is more practical to take measures to prevent the entry of the foreign matter in the battery case.

As an example of such measures, Patent Literature 1 discloses a method for forming a closed-end cylindrical battery case provided with a reverse-tapered opening having a larger diameter than the diameter of a middle part thereof. Since the opening is reverse-tapered, burrs formed on the end face are prevented from coming into contact with the gasket for sealing the battery case. Further, when the battery elements are placed in the battery case, contact between the active material mixture layer and the burrs is also avoided. Accordingly, the entry of the foreign matter in the battery case is prevented.

As another example, Patent Literatures 2 and 3 disclose a method for curving the end face of the reverse-tapered opening of the battery case. This method makes it possible to prevent the opening from scratching the gasket and the foreign matter such as a peeled piece of the active material mixture layer from entering the battery case.

The end face of the opening is curved in the following manner. As shown in FIG. 7B, a closed-end cylindrical body 100 is formed to have an opening having a reverse-tapered part 101 having a larger inner diameter d2 than the inner diameter d1 of the middle part of the cylindrical body 100 and another reverse-tapered part 102 having a larger inner diameter d3 than d2. Then, the reverse-tapered part 102 is cut off in the direction parallel to the side face of the cylindrical body 100 (in the direction of an arrow A depicted in FIG. 7B) to leave a rounded inner face at the opening of the battery case as shown in FIG. 7A.

Patent Literature 1: Japanese Unexamined Patent Publication No. 2001-52656
Patent Literature 2: Japanese Unexamined Patent Publication No. 9-161736
Patent Literature 3: Japanese Unexamined Patent Publication No. 10-321198

SUMMARY OF THE INVENTION

Problem that the Invention is to Solve

The above-mentioned conventional measures are useful in view of reducing the effect of the burrs formed on the end face of the battery case. However, there still remains a possibility that the foreign matter enters the battery case and brings about internal short circuit due to variations in the production process. In particular, as the need for batteries of smaller size and higher capacity has been increasing in recent years, not only positive and negative electrodes but also a separator between them is becoming thinner. Therefore, a very small foreign matter that has not been regarded as a problem so far could be a cause of decrease of battery characteristics if it enters the battery case. Further, when the burrs formed on the end face of the battery case come off to cause external short circuit between the battery case and the lid, voltage drop may possibly occur.

The conventional measures described above have focused on the contact between the burrs formed on the end face of the battery case and the positive or negative electrode active material mixture layer or the gasket.

After a close study of the effect of the burrs formed on the end face of the battery case, the inventor of the present invention has reached the following finding distinct from the conventional point of view.

FIG. 8 shows a flowchart of a general battery assembly steps. First, a metallic plate is drawn thin (S1) to form a closed-end cylindrical body 100. Then, part of the cylindrical body 100 at the opening thereof is cut away (S2) to obtain a battery case 200. Then, battery elements are placed in the battery case 200 (S3) and the battery case 200 is subjected to beading to form a bead near the opening (S4). Subsequently, a sealing member (a lid and a gasket) is fitted in the opening of the battery case 200 (S5) and the battery case 200 is sealed by crimping (S6). In this manner, the battery is assembled.

The conventional measures have focused on the step in which the burrs formed on the end face of the battery case 200 may come into contact with the positive or negative electrode active material mixture layer (S3) or the gasket (S5).

The inventor of the present invention has noted the step of pressing a certain part of the battery case 200 with a pressing member while the battery case 200 is fixed by a holding jig, i.e., the steps of beading (S4) and crimping (S6).

FIG. 9 shows a common way of the beading (S4). First, in the state where a holding jig 300 holds the battery case 200 and a retaining jig 302 abuts the opening end of the battery case 200, a pressing member (die) 301 is used to press the outer circumference of the battery case 200 toward an axis of the battery case 200 (in the direction of an arrow A). Simultaneously, the bottom of the battery case 200 is pressed in the axial direction of the battery case 200 (in the direction of an arrow B) together with the holding jig 300 to form a bead 201 around the circumference of the battery case 200.

FIGS. 10A and 10B show a common way of the crimping (S6). In these figures, a gasket and a lid fitted in the opening of the battery case 200 are not depicted. As shown in FIG. 10A, the battery case 200 is fixed by a holding jig 400 at the bead. In this state, a pressing member (crimping jig) 401 is pressed against the opening end of the battery case 200 in the direction of an arrow A such that the opening of the battery case 200 is crimp-sealed as shown in FIG. 10B.

As shown in FIGS. 9, 10A and 10B, the opening end of the battery case 200 is pressed by the retaining jig 302 in the beading step (S4) and by the crimping jig 401 in the crimping step (S6). As a result, the burrs formed on the end face of the battery case 200 are shaved off by these jigs and the shavings of the burrs may possibly come into the battery case 200. Even if the shavings of the burrs may not directly enter the battery case 200, the shavings adhered to the jigs 302 and 401 may come off and enter the battery case 200 in the steps of beading (S4) and crimping (S6) if the steps (S4) and (S6) are repeated using the jigs 302 and 401. Thus, in the conventional beading (S4) and crimping (S6) steps, sufficient attention has not been paid to the entry in the battery case 200 of the foreign matter derived from the burrs on the end face of the battery case 200.

In view of the foregoing, the present invention has been achieved. A main object of the invention is to provide a method for manufacturing a battery case in which burrs formed on the end face of the battery case are prevented from entering the battery case in the assembly process of the battery (in the beading or crimping step).

Means of Solving the Problem

In order to achieve the object, the inventor of the present invention has made a study on the states of the burrs formed. FIG. 11A illustrates the step of cutting part of the cylindrical body 100 at an opening 110 thereof and FIG. 11B shows a burr 130a formed on the cut surface 120a of the cylindrical body 100 after the cutting.

The cutting step shown in FIG. 11A corresponds to the process shown in FIG. 7B. Specifically, a punch 500 arranged outside the cylindrical body 100 (e.g., a cylindrical punch having an inner diameter larger than the outer diameter of the cylindrical body 100) is pressed toward a die 501 arranged inside the cylindrical body 100 (e.g., a cylindrical die having an outer diameter smaller than the inner diameter of the cylindrical body 100) to cut the cylindrical body 100. According to this method, a burr 130a extending upward in the direction parallel to the side face of the cylindrical body 100 is formed on the cut surface 120a of the cylindrical body 100 as shown in FIG. 11B (hereinafter, it is referred to as an upward burr).

If the upward burr 130a is generated on the end face of the cylindrical body (battery case) 100, it may possibly be hit and crushed by the jig 302 or 401 in the beading or crimping step shown in FIGS. 9, 10A and 10B.

In the cutting step shown in FIG. 12A, part of the cylindrical body 100 at the opening 110 is cut away in the direction parallel to the side face of the cylindrical body 100. However, the cutting may be carried out in the direction perpendicular to the side face of the cylindrical body 100. In this case, a punch 503 arranged inside the cylindrical body 100 (e.g., a cylindrical punch having an outer diameter smaller than the inner diameter of the cylindrical body 100) is pressed toward a die 502 arranged outside the cylindrical body 100 (e.g., a cylindrical die having an inner diameter larger than the outer diameter of the cylindrical body 100) to cut the cylindrical body 100. According to this method, a burr 130b extending outward in the direction perpendicular to the side face of the cylindrical body 100 is formed on the cut surface 120b of the cylindrical body 100 as shown in FIG. 12B (hereinafter, it is referred to as an outward burr).

If the outward burr 130b is generated on the end face of the cylindrical body (battery case) 100, it may possibly be hit and crushed by the jig 302 or 401 in the beading or crimping step just like the upward burr 130a.

With the foregoing in mind, the inventor of the present invention has found that the possibility that the burr on the end face of the cylindrical body comes off due to contact with the jig used in the battery assembling step (beading or crimping step) and enters the battery case is dependent on the extending direction of the burr. As a result, the inventor has arrived at a finding that the possibility of the contact between the burr and the jig in the beading or crimping step is minimized by cutting the cylindrical body 100 in the direction opposite the direction shown in FIG. 12A, i.e., by pressing the punch arranged outside the cylindrical body 100 toward the die arranged inside the cylindrical body 100, to form a burr extending inward in the direction perpendicular to the side face of the cylindrical body 100 (hereinafter it is referred to as an inward burr).

Accordingly, a method for manufacturing a battery case of the present invention includes the steps of: drawing a metallic plate to form a cylindrical body having a closed end; and cutting away part of the cylindrical body at an opening thereof in a direction perpendicular to an axis of the cylindrical body, wherein the step of cutting the cylindrical body is carried out by arranging a first blade inside the cylindrical body and a second blade outside the cylindrical body closer to the opening of the cylindrical body than the first blade and moving the second blade relatively toward the axis of the cylindrical body with the first blade kept abutting the inner circumference of the cylindrical body.

According to this method, an inward burr formed on the cut surface of the cylindrical body or an end face of the battery case is effectively prevented from entering the battery case in the assembly of the battery.

The first blade preferably consists of a round blade having an outer diameter smaller than the inner diameter of the cylindrical body. The second blade preferably makes contact with the cylindrical body at a substantially arc-shaped part thereof having an inner diameter larger than the outer diameter of the cylindrical body.

In the step of cutting the cylindrical body, the cylindrical body is preferably rotated about its axis and moved along the substantially arc-shaped part of the second blade.

Effect of the Invention

According to the method for manufacturing the battery case of the present invention, the burr formed on the end face of the battery case is prevented from entering the battery case in the battery assembly step, thereby effectively reducing the possibility of the internal short circuit between the positive and negative electrodes. Therefore, highly reliable batteries are manufactured with stability. Further, the present invention also makes it possible to effectively prevent the possibility of external short circuit between the battery case and the lid due to the burr coming off the end face of the battery case. As a result, the batteries are manufactured with stable performance.

BRIEF DESCRIPTION OF THE DRAWINGS

FIGS. 1A, 1B and 1C are views illustrating a method for manufacturing a battery case according to an embodiment of the present invention, while FIG. 1A is a sectional view of a cylindrical body, FIG. 1B is a partial enlargement illustrating the step of cutting the cylindrical body and FIG. 1C is a view illustrating a cut surface of the cylindrical body.

FIG. 6 is a graph illustrating the rate of occurrence of voltage drop among batteries according to the present invention.

FIGS. 7A and 7B are views illustrating a conventional step of cutting the cylindrical body.

EXPLANATION OF REFERENCE NUMERALS

Figure 1A:
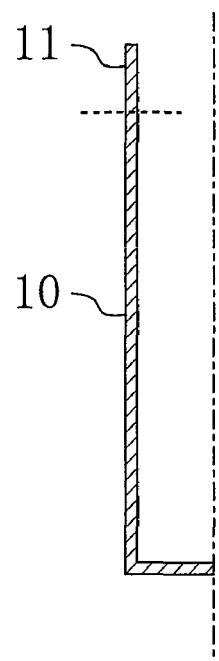

10 Cylindrical body
12 Cut surface
13 Burr
20 Battery case
20a Cut surface
20b Fractured surface
21 Positive electrode mixture pellet
22 Gelled negative electrode
22, 32 Jig
23 Separator
24 Gasket
25 Negative electrode collector
26 Lid
27 Bead
30, 40 Die (second blade)
31, 41 Punch (first blade)

BEST MODE FOR CARRYING OUT THE INVENTION

Hereinafter, an embodiment of the present invention will be described with reference to the drawings. In the following drawings, components having substantially the same function are identified by the same reference numeral to omit lengthy explanation. It should be noted that the present invention is not limited to the embodiment.

Figure 1B:
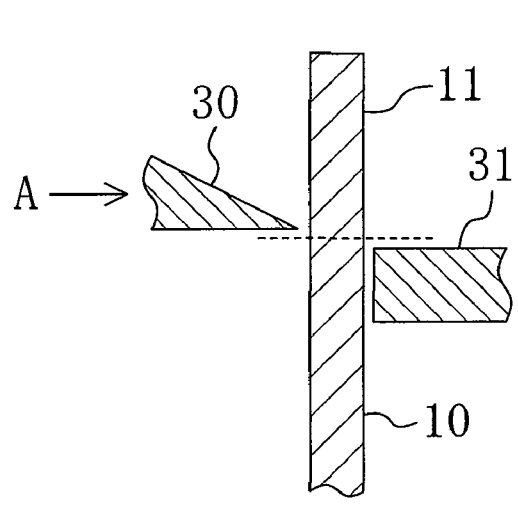
Figure 1C:
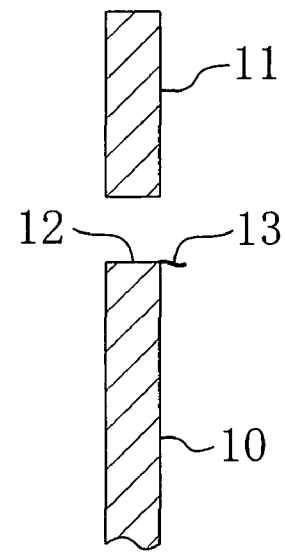

FIGS. 1A to 1C schematically show the method for manufacturing a battery case according to an embodiment of the present invention. FIG. 1A is a sectional view of a closed-end cylindrical body 10 obtained by drawing a metallic plate. Part of the cylindrical body 10 at an opening 11 thereof is cut away in the direction perpendicular to the axis of the cylindrical body 10 (along a dotted line shown in the figure) to prepare a battery case.

In the step of cutting the cylindrical body 10, as shown in an enlargement of FIG. 1B, a second blade 30 arranged on the outer circumference of the cylindrical body 10 is moved relatively toward an axis of the cylindrical body 10 (in the direction of an arrow A shown in FIG. 1B) with a first blade 31 kept abutting the inner circumference of the cylindrical body 10 to cut the cylindrical body 10. After the cutting, an inward burr 13 extending inward in the direction perpendicular to the side face of the cylindrical body 10 is formed on a cut surface 12 of the cylindrical body 10 as shown in FIG. 1C.

As long as the burr formed on the cut surface (end face of the battery case) of the cylindrical body 10 extends inward in the direction perpendicular to the side face of the cylindrical body 10, contact between the burr and a jig used in the beading or crimping step is prevented as much as possible. Therefore, the burr formed on the end face of the battery case is effectively prevented from coming in the battery case in the assembly process of the battery.

Figure 2:
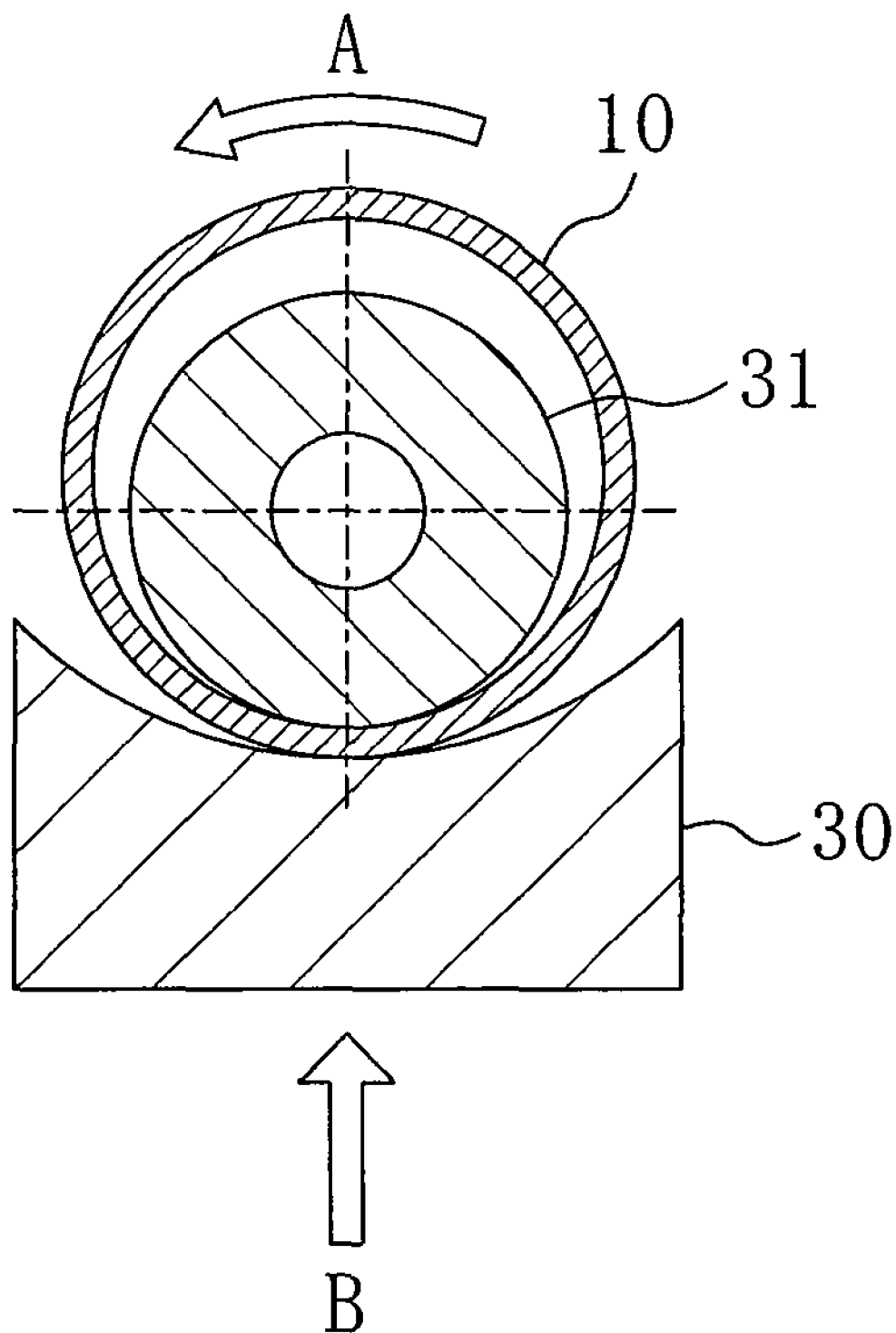
FIG. 2 is a view specifically illustrating the step of cutting the cylindrical body according to the embodiment.

FIG. 2 is a view specifically illustrating the step of cutting the cylindrical body 10 according to the present embodiment. As shown in FIG. 2, a cylindrical punch (first blade) 31 having an outer diameter smaller than the inner diameter of the cylindrical body 10 is arranged inside the cylindrical body 10 and a die (second blade) 30 is arranged outside the cylindrical body 10. The die 30 makes contact with the cylindrical body 10 at a substantially arc-shaped part thereof having an inner diameter larger than the outer diameter of the cylindrical body 10. With the punch 31 kept abutting the inner circumference of the cylindrical body 10, the cylindrical body 10 is rotated about its axis in the direction of an arrow A and the die 30 is simultaneously moved in the direction of an arrow B to cut the cylindrical body 10.

As the cylindrical body 10 itself is rotated, the cutting of the cylindrical body 10 in the predetermined direction is carried out by merely moving the die 30 toward the axis of the cylindrical body 10 and the need of arranging the die 30 around the entire circumference of the cylindrical body 10 is eliminated. The die 30 in the form shown in FIG. 2 may be replaced with a round blade.

Figure 3:
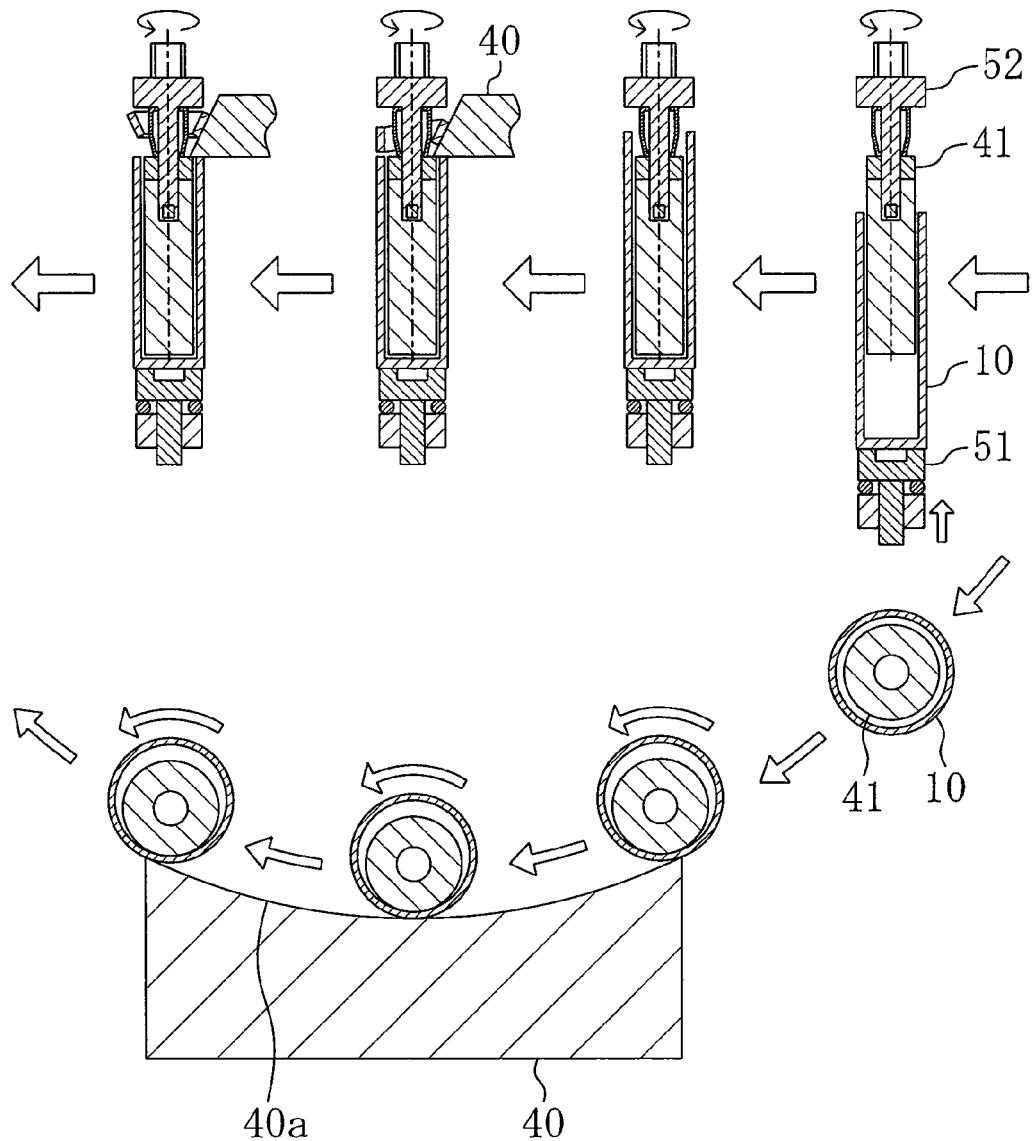
FIG. 3 is a view specifically illustrating another step of cutting the cylindrical body according to the embodiment.

FIG. 3 schematically illustrates another step of cutting the cylindrical body 10 according to the present embodiment. As shown in FIG. 3, a cylindrical punch (first blade) 41 having an outer diameter smaller than the inner diameter of the cylindrical body 10 is arranged inside the cylindrical body 10 and a die (second blade) 40 is arranged outside the cylindrical body 10. The die 40 makes contact with the cylindrical body 10 at a substantially arc-shaped part thereof having an inner diameter larger than the outer diameter of the cylindrical body 10. With the punch 41 kept abutting the inner circumference of the cylindrical body 10, the cylindrical body 10 is rotated about its axis and simultaneously moved along the substantially arc-shaped part 40a of the die 40 to cut the cylindrical body 10.

According to this method, a plurality of cylindrical bodies 10 can be cut by successively moving the cylindrical bodies 10 along the substantially arc-shaped part 40a of the die 40. This makes it possible to achieve efficient mass production of the battery case.

The step of cutting the cylindrical body 10 of the present invention is not limited to the foregoing steps. The cutting may be carried out in any way as long as the burr 13 extending inward in the direction perpendicular to the side face of the cylindrical body 10 is formed on the cut surface 12 of the cylindrical body 10. For example, in the step shown in FIG. 1B, with the second blade 30 fixed and the first blade 31 kept abutting the cylindrical body 10, the cylindrical body 10 may be moved toward the second blade 30 to cut the cylindrical body 10.

Figure 4:
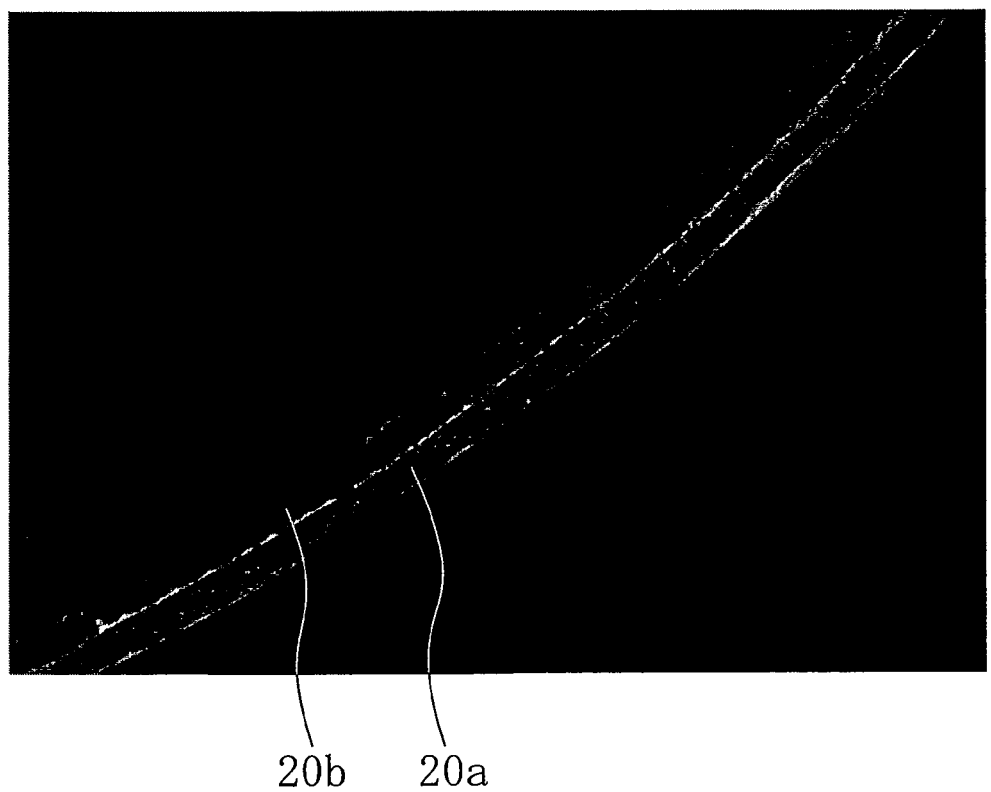
FIG. 4 is an image showing part of an end face of the battery case according to the embodiment.

FIG. 4 is an image showing part of the end face of the battery case manufactured by the method of the present invention. In the present invention, the cutting of the cylindrical body 10 is carried out by moving the second blade 30 arranged outside the cylindrical body 10 toward the inside of the cylindrical body 10. As a result, as shown in FIG. 4, the obtained end face of the battery case includes a cut surface 20a on the outer circumferential side and a fractured surface 20b on the inner circumferential side. Further, an edge of the opening of the battery case on the outer circumferential side is rounded.

Figure 5:
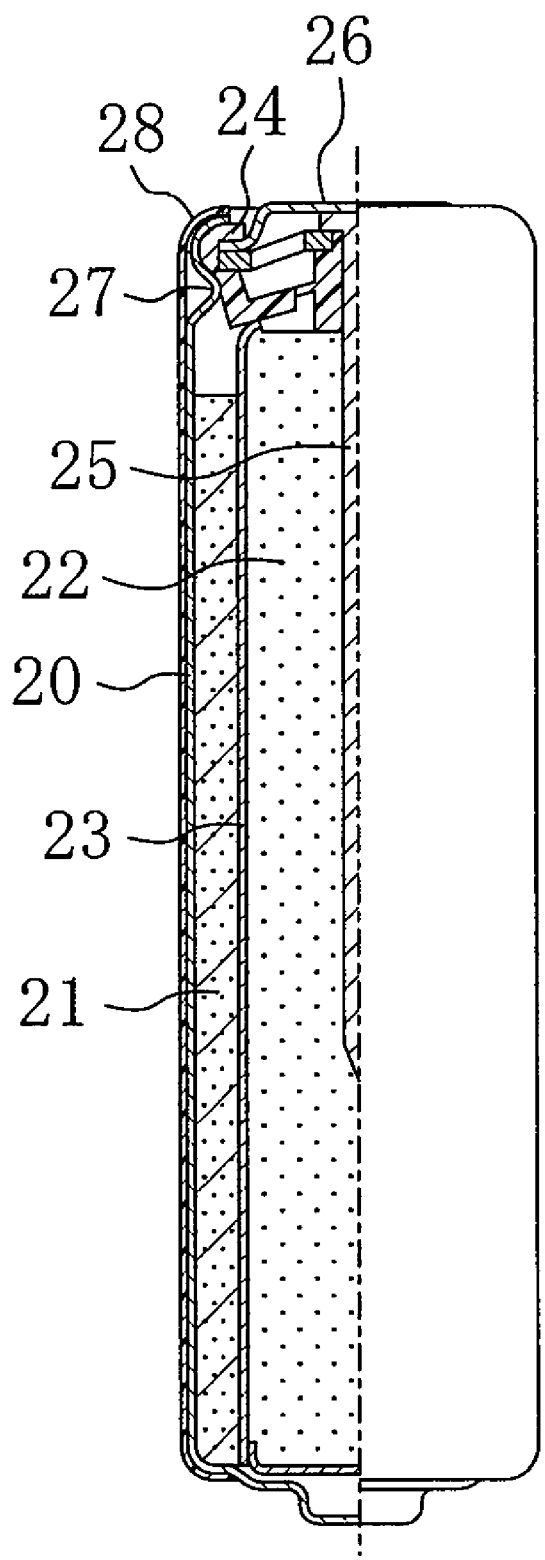
FIG. 5 is a sectional view illustrating the structure of a cylindrical hermetic battery according to the present invention.
Figure 8:
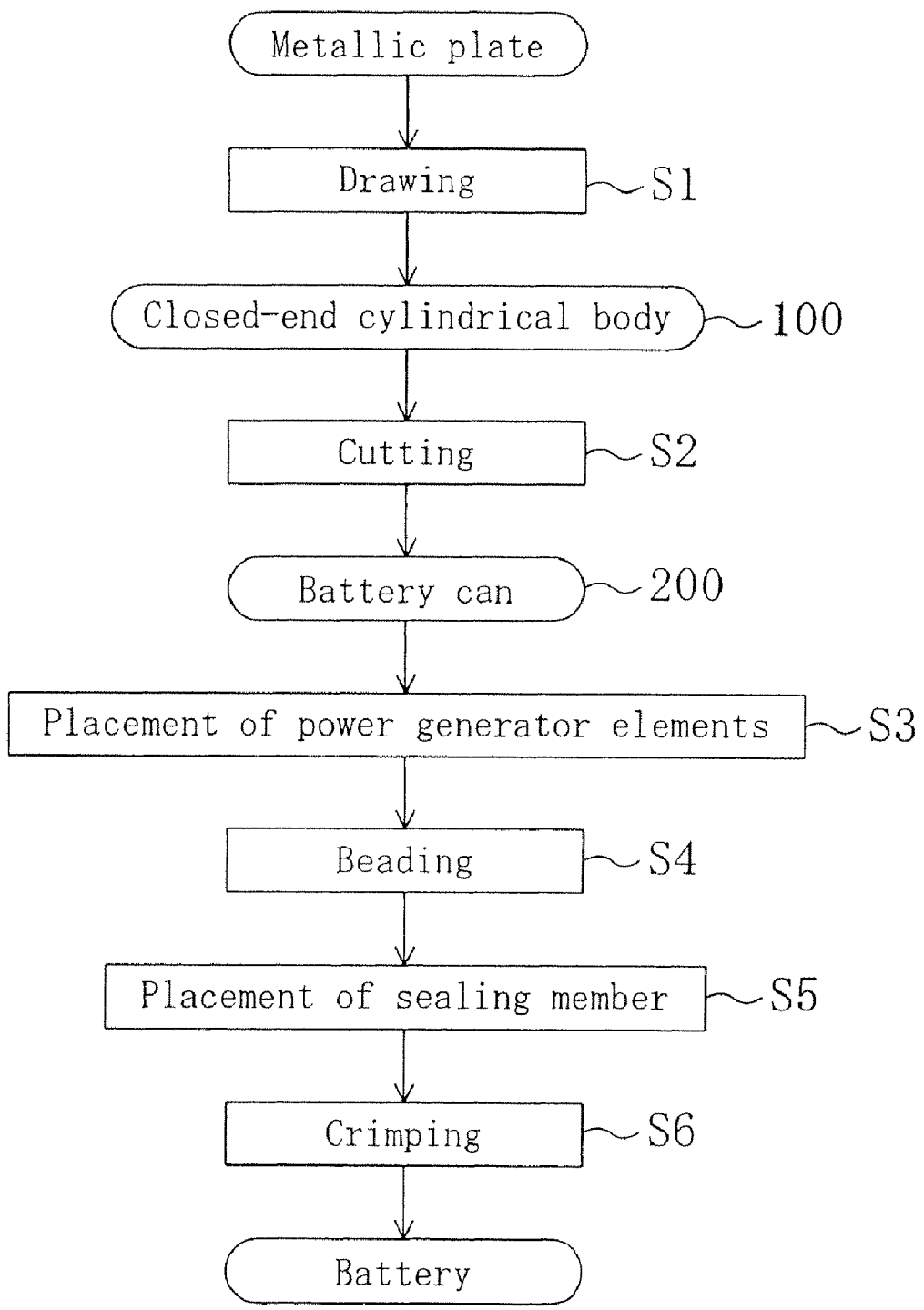
FIG. 8 is a flowchart illustrating conventional battery assembly steps.
Figure 9:
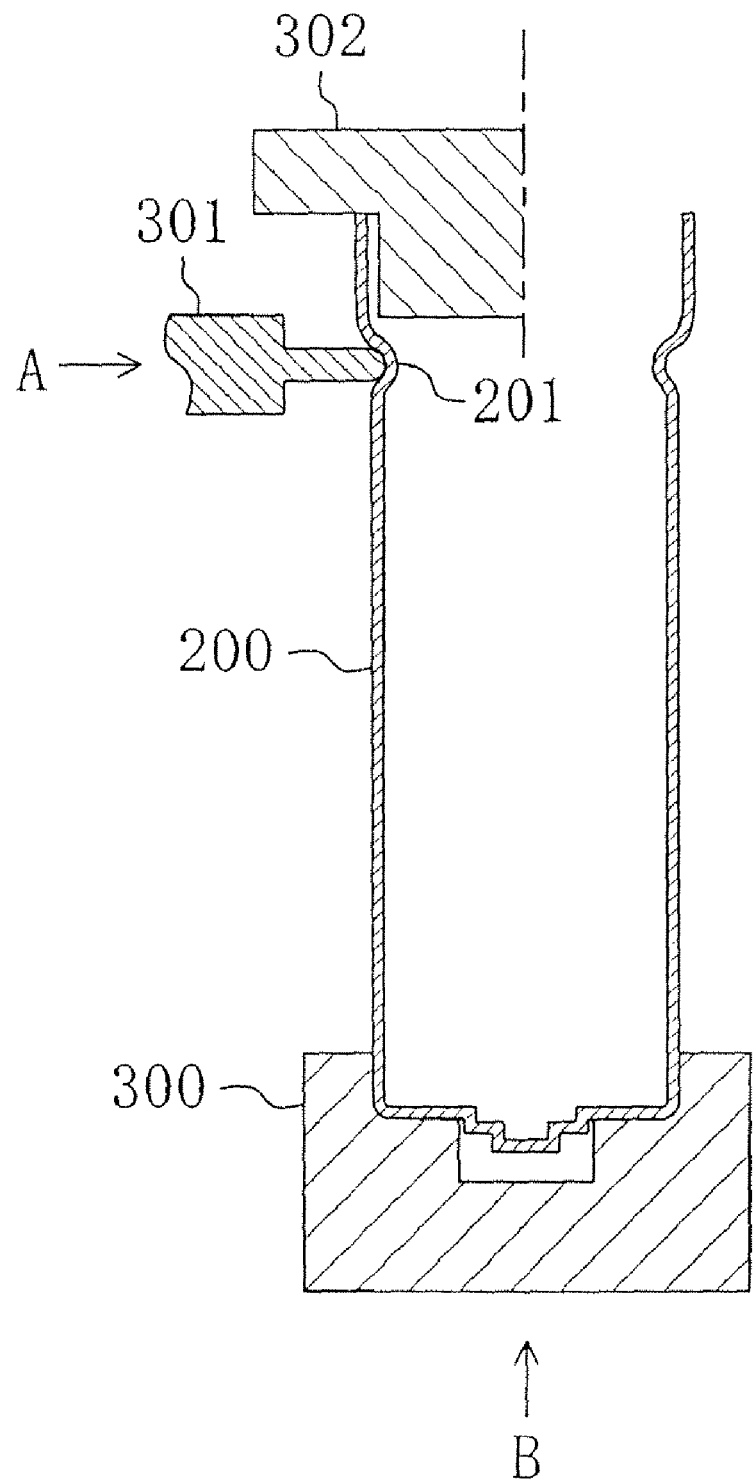
FIG. 9 is a sectional view illustrating a conventional beading step.
Figures 10A, 10B:
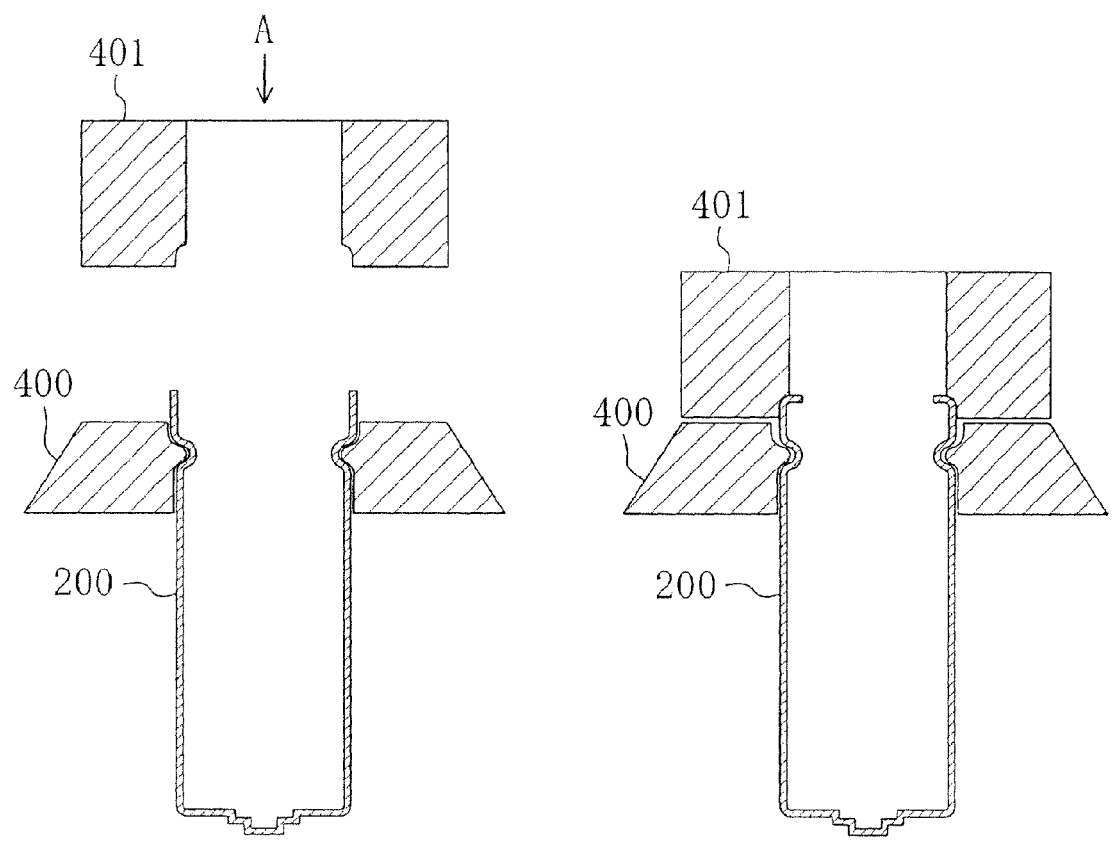
FIGS. 10A and 10B are sectional views illustrating a conventional crimping step.
Figure 11A:
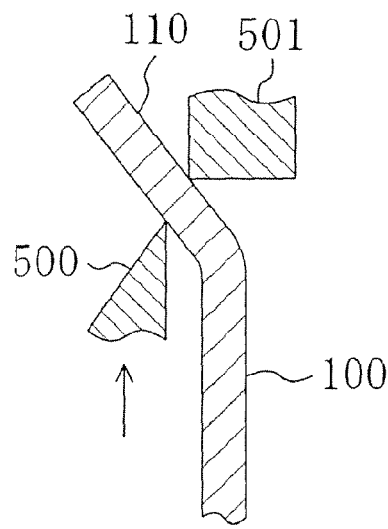
FIGS. 11A and 11B are sectional views illustrating how burrs are formed in the conventional step of cutting the cylindrical body.
Figure 11B:
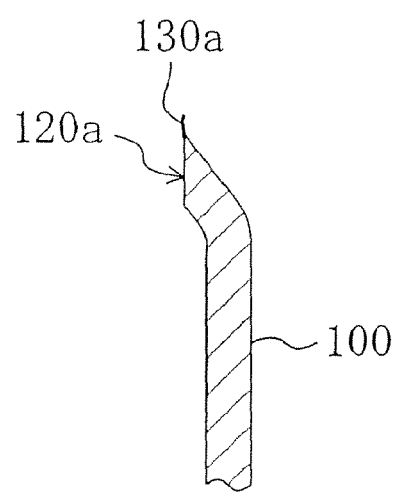

FIG. 5 is a sectional view illustrating the structure of a cylindrical hermetic battery including a battery case obtained by the method for manufacturing the battery case of the present invention. The hermetic battery according to the present invention is manufactured by the general process shown in FIG. 8. To be more specific, positive and negative battery elements are arranged in the battery case with a separator interposed therebetween. Then, a bead is formed around the circumference of part of the battery case near the opening thereof, a lid and a gasket are placed in the opening of the battery case, and then the opening of the battery case is crimp-sealed. In this manner, the hermetic battery is obtained.

The hermetic battery shown in FIG. 5 is an example of an alkaline dry battery. In the battery case (also serving as a positive electrode terminal) 20, positive electrode mixture pellets 21 and a gelled negative electrode 22 are arranged with a separator 23 interposed therebetween. A bead 27 is formed around the circumference of part of the battery case 20 near the opening of the battery case 20. A lid 26 (also serving as a negative electrode terminal) integrated with a gasket 24 and a negative electrode collector 25 is arranged in the battery case 20 in alignment with the bead 27. An end 28 of the battery case 20 is crimped to the lid 26 with the gasket 24 interposed therebetween to seal the opening of the battery case 20.

The effects of the present invention, i.e., prevention of the burr coming off the end face of the battery case 20 from entering the battery case 20 and prevention of the short circuit between the battery case 20 and the lid 26, are significantly exhibited in the mass production of the battery. As an example of the effects of the present invention, FIG. 6 shows a graph of lot-to-lot comparison of the rate of occurrence of voltage drop among mass-produced nickel-metal hydride batteries. The voltage drop is caused by short circuit between the battery case 20 and the lid 26 due to the burr coming off the end face of the battery case 20.

Figure 12A:
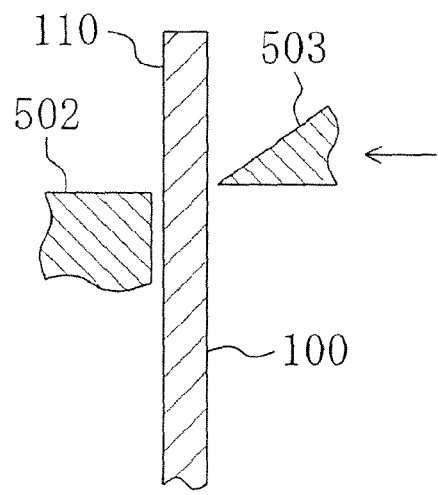
FIGS. 12A and 12B are sectional views illustrating how burrs are formed in the conventional step of cutting the cylindrical body.
Figure 12B:
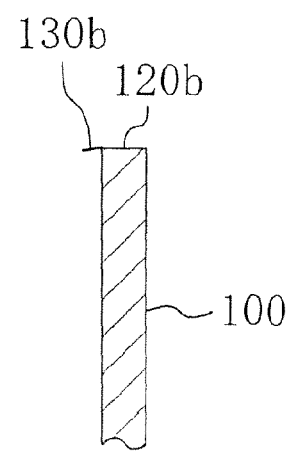

Batteries of lot Nos. 1 to 7 include battery cases manufactured by the method of the present invention (inward burr formed on the end face). In contrast, batteries of lot No. 8 include battery cases manufactured by the method explained in FIG. 12A (outward burr formed on the end face). As shown in FIG. 6, the rate of occurrence of voltage drop among the batteries according to the method of the present invention is reduced by one digit as compared with that among the batteries to which the method of the present invention is not applied.

As described above, the method of the present invention exhibits superior effect if it is applied to the mass production of the batteries and improves the reliability of the mass-produced batteries. With the recent trend of size reduction and capacity improvement of the battery, even a very small foreign matter, if contained in the battery, will have a significant effect on the battery characteristics. Therefore, the application of the present invention allows improvement in yield of the mass production.

The preferred embodiments of the present invention described above are not limitative and may be varied in many ways. The hermetic batteries of interest are not particularly limited and the invention is applicable to primary batteries such as manganese dry batteries and lithium batteries and secondary batteries such as lithium ion batteries and nickel-metal hydride batteries.

INDUSTRIAL APPLICABILITY

Thus, the present invention is useful for hermetic batteries required to be highly reliable and applicable to primary and secondary batteries.

The invention claimed is:

1. A method for manufacturing a battery case comprising the steps of:
    drawing a metallic plate to form a cylindrical body having a closed end; and
    cutting away part of the cylindrical body at an opening thereof in the direction perpendicular to an axis of the cylindrical body,
    wherein the step of cutting the cylindrical body is carried out by arranging a first blade inside the cylindrical body and a second blade outside the cylindrical body closer to the opening than the first blade and
    moving the second blade relatively toward the axis of the cylindrical body with the first blade kept abutting the inner circumference of the cylindrical body.

2. The method of claim 1, wherein the first blade consists of a round blade having an outer diameter smaller than the inner diameter of the cylindrical body.

3. The method of claim 1, wherein the second blade makes contact with the cylindrical body at a substantially arc-shaped part thereof having an inner diameter larger than the outer diameter of the cylindrical body.

4. The method of claim 1, wherein the cylindrical body is rotated about its axis in the step of cutting the cylindrical body.

5. The method of claim 4, wherein the cylindrical body is moved along the substantially arc-shaped part of the second blade in the step of cutting the cylindrical body.

6. The method of claim 5, wherein a plurality of cylindrical bodies are cut by successively moving the cylindrical bodies along the substantially arc-shaped part of the second blade.

7. The method of claim 1, wherein the cylindrical body is moved toward the fixed second blade with the first blade kept abutting the cylindrical body in the step of cutting the cylindrical body.

8. The method of claim 1, wherein an end face of the battery case prepared by cutting away part of the cylindrical body at the opening thereof includes a cut surface on the outer circumferential side and a fractured surface on the inner circumferential side.

9. The method of claim 8, wherein an edge of the opening of the battery case on the outer circumferential side is rounded.

10. The method of claim 1, wherein the step of drawing the metallic plate includes the step of drawing and ironing the metallic plate.

11. A battery case manufactured by the method of claim 1.

12. A method for manufacturing a cylindrical hermetic battery comprising the steps of:
 preparing a battery case according to the method of claim 1;
 arranging positive and negative battery elements in the battery case with a separator interposed therebetween;
 arranging a lid in an opening of the battery case and a gasket between the lid and the battery case; and
 pressing a crimping jig against an end of the battery to crimp the end of the battery tightly onto the gasket.

13. The method of claim 12 further comprising the step of forming a bead around the outer circumference of part of the battery case near the opening of the battery case, wherein
 the bead is formed by pressing a die against the outer circumference of the battery case toward the axis of the battery case with a retaining jig kept abutting the end of the battery case and simultaneously pressing the bottom of the battery case in the axial direction of the battery case.

14. A hermetic battery manufactured by the method of claim 12.

* * * * *